US012701043B2

(12) United States Patent
Chopra et al.

(10) Patent No.: US 12,701,043 B2
(45) Date of Patent: Aug. 4, 2026

(54) COMMUNICATION NETWORK FAILURE DETECTION AND RESTORATION

(71) Applicant: Rakuten Symphony, Inc., Tokyo (JP)

(72) Inventors: Akashdeep Chopra, Tokyo (JP);
Chandan Kumar Singh, Tokyo (JP);
Ashish Madan, Singapore (SG)

(73) Assignee: RAKUTEN SYMPHONY, INC.,
Tokyo (JP)

( * ) Notice: Subject to any disclaimer, the term of this
patent is extended or adjusted under 35
U.S.C. 154(b) by 474 days.

(21) Appl. No.: 18/259,585

(22) PCT Filed: May 31, 2023

(86) PCT No.: PCT/US2023/067662
§ 371 (c)(1),
(2) Date: Jun. 28, 2023

(87) PCT Pub. No.: WO2024/248851
PCT Pub. Date: Dec. 5, 2024

(65) Prior Publication Data
US 2024/0406060 A1      Dec. 5, 2024

(51) Int. Cl.
*H04L 41/0668* (2022.01)

(52) U.S. Cl.
CPC ................................. *H04L 41/0668* (2013.01)

(58) Field of Classification Search
CPC ........................ H04L 41/0668; H04L 43/0817
See application file for complete search history.

(56) References Cited

U.S. PATENT DOCUMENTS

| | | | |
|---|---|---|---|
| 10,289,629 B1 * | 5/2019 | Trier .................... | H04L 43/0876 |
| 10,684,888 B1 * | 6/2020 | Sethuramalingam ........................ | |
| | | | G06F 11/203 |
| 10,960,304 B1 * | 3/2021 | Pare ...................... | G06F 11/203 |
| 2002/0152305 A1 | 10/2002 | Jackson et al. | |
| 2021/0289371 A1 * | 9/2021 | Bagwell .............. | H04L 65/1045 |
| 2021/0392135 A1 * | 12/2021 | Rao ........................ | H04L 63/083 |

(Continued)

FOREIGN PATENT DOCUMENTS

| | | |
|---|---|---|
| EP | 3561694 A1 | 10/2019 |
| EP | 4047886 A1 | 8/2022 |

OTHER PUBLICATIONS

Cisco, Day(-1), Day-0, Day-1,Day-2 . . . N Configurations, Apr. 27, 2018, URL retrieved via: https://community.cisco.com/t5/crosswork-automation-hub-blogs/day-1-day-0-day-1-day-2-n-configurations/ba-p/3658255 (Year: 2018).*

*Primary Examiner* — Schquita D Goodwin
(74) *Attorney, Agent, or Firm* — HAUPTMAN HAM, LLP

(57) ABSTRACT

An apparatus includes a processor and a memory having instructions stored thereon that, when executed by the processor, cause the apparatus to process a first notification received from a first network node to determine a first status of the first network node. The apparatus is also caused to process a second notification received from a second network node to determine a second status of the second network node. The apparatus is further caused to, response to determining the first status and the second status indicate an alarm state, cause a workload assigned to a first data center associated with the first network node and the second network node to be reassigned to a second data center different from the first data center.

20 Claims, 11 Drawing Sheets

(56)         References Cited

U.S. PATENT DOCUMENTS

2023/0100729 A1*    3/2023  Kostic ................... H04W 48/06
                                                 370/230
2023/0412478 A1*  12/2023  Lawn .................. H04L 43/0817
2024/0061716 A1*    2/2024  Bennetone ............ G06F 9/5077
2024/0333622 A1*  10/2024  Zad Tootaghaj .... H04L 43/0876

* cited by examiner

COMMUNICATION NETWORK FAILURE DETECTION AND RESTORATION

RELATED APPLICATIONS

The present application is a National Phase of International Application No. PCT/US2023/067662, filed May 31, 2023.

TECHNICAL FIELD

The present disclosure is related to detecting a failure in a communication network and restoring the communication network.

BACKGROUND

Network service providers and device manufacturers (e.g., wireless, cellular, etc.) are continually challenged to deliver value and convenience to consumers by, for example, providing compelling network services that are dependable and capable of being flexibly constructed, scalable, diverse, and economically operated.

SUMMARY

An aspect of this description is directed to an apparatus comprising a processor and a memory having instructions stored thereon that, when executed by the processor, cause the apparatus to process a first notification received from a first network node to determine a first status of the first network node. The apparatus is also caused to process a second notification received from a second network node to determine a second status of the second network node. The apparatus is further caused to, in response to determining the first status and the second status indicate an alarm state, cause a workload assigned to a first data center associated with the first network node and the second network node to be reassigned to a second data center different from the first data center.

Another aspect of this description is directed to a method comprising processing, by a processor, a first notification received from a first network node to determine a first status of the first network node. The method also comprises processing a second notification received from a second network node to determine a second status of the second network node. The method further comprises, in response to determining the first status and the second status indicate an alarm state, causing a workload assigned to a first data center associated with the first network node and the second network node to be reassigned to a second data center different from the first data center.

Another aspect of this description is directed to a non-transitory computer readable medium having instructions stored thereon that, when executed by a processor, cause an apparatus to process a first notification received from a first network node to determine a first status of the first network node. The apparatus is also caused to process a second notification received from a second network node to determine a second status of the second network node. The apparatus is further caused to, in response to determining the first status and the second status indicate an alarm state, cause a workload assigned to a first data center associated with the first network node and the second network node to be reassigned to a second data center different from the first data center.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
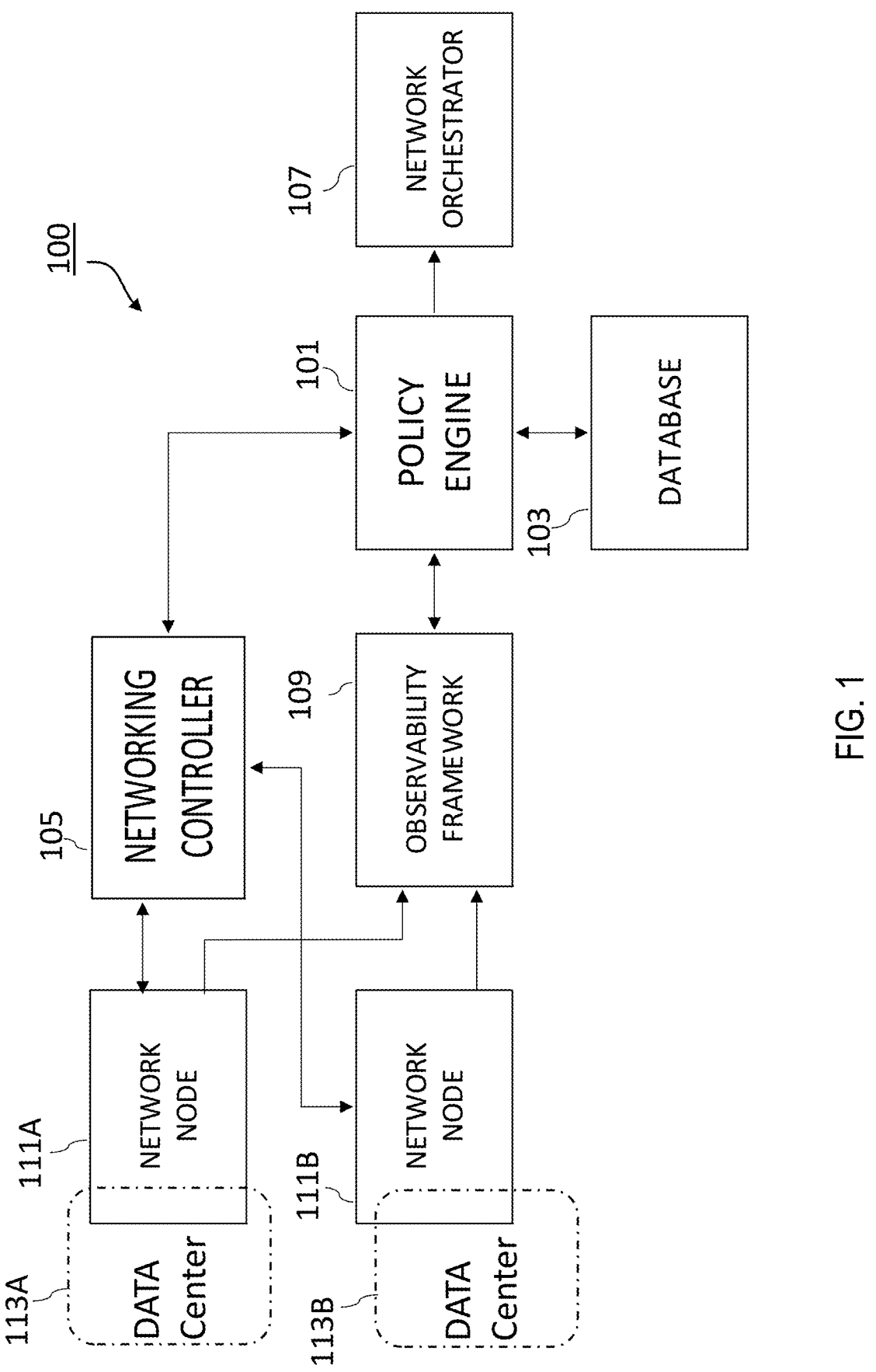
FIG. 1 is a diagram of a system that facilitates detecting a communication network failure and restoring the communication network, in accordance with one or more embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, the present disclosure may omit some operations, such as a "response" or "send receipt" that corresponds to the previous operation, for the purpose of simplicity and clarity.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Some communication networks are provided by employing network orchestrators that deploy numerous network functions. For example, some communication networks involve deploying thousands of radio access network (RAN) network functions. Such communication systems are prone to errors that result from systemic failure. For example, some cell sites in a communication network are served by a radio unit that is divided into a centralized unit (CU) and a distributed unit (DU). If a complete outage occurs in a distributed point-of-presence (Distri PoP), there is often no backup readily available for the CU running on the corresponding cluster. This will often result in a complete outage of the cell sites being served by the CU that are running on the failed Distri POP, even if the connected DUs are up and running. Similar issues arise in the case of rack failures, power failures, spine switch failures, access gateway switch failures, etc. Conventionally, failures in a communication network are resolved by human intervention which can be troublesome, time consuming, and result in extended communication network and/or network function or network service downtime before the failure is resolved.

FIG. 1 is a diagram of a system 100 that facilitates detecting a communication network failure and restoring the communication network, in accordance with one or more embodiments.

System 100 makes it possible to automatically detect and address a failure in a communication network and/or a data center that at least partially implements the communication network. In some embodiments, system 100 comprises one or more components of a centralized unit (CU).

System 100 comprises a policy engine 101, a database 103, a networking controller 105, a network orchestrator 107, an observability framework 109 and network nodes 111A, 111B.

The policy engine 101 is a network assurance policy engine that triggers actions toward a communication network managed by network orchestrator 107 based upon matching condition(s) associated with a communication network failure defined in the database 103. The networking controller 105 is a centralized, programmable point of automation configured to manage, configure, monitor, and troubleshoot network infrastructure. The network orchestrator 107 is a network controller that performs in setting up devices, applications, and services in the network to assign a workload. In some embodiments, the functions of the above components, including the networking controller 105 and the network orchestrator 107, are software-defined, and are capable of being combined in, or replaced by, one component. In some embodiments, one or more components included in system 100 such as the policy engine 101, the networking controller 105, the network orchestrator 107, the observability framework 109, or the network nodes 111A, 111B comprises a set of computer readable instructions that, when executed by a processor such as a processor 1103 (FIG. 11), causes one or more of the policy engine 101, the networking controller 105, the network orchestrator 107, the observability framework 109, or the network nodes 111A, 111B to perform the processes discussed in accordance with one or more embodiments.

In some embodiments, database 103 is an inventory of information comprising node data, node identifiers (IDs), node types, locations of the nodes, data-handling capacities of the data centers, node characteristics, node capabilities, node substitution rules, or other suitable information about various network nodes. Database 103 is a memory such as a memory 1105 (FIG. 11) capable of being queried or caused to store data in accordance with one or more embodiments.

In some embodiments, the network nodes 111A, 111B are connected to data centers 113A, 113B. In some embodiments, system 100 comprises more than two network nodes that are connected to one or more corresponding data centers 113. In some embodiments, the two or more network nodes 111A, 111B (or any additional network nodes 111) are connected to a same data center such as data center 113A, for example. Data centers 113A, 113B are, for example, where workloads associated with operating the communication network are assigned. In some embodiments, the network nodes 111A, 111B each comprise one or more of a switch, a border leaf switch, a spine switch, an access gateway switch, a computer, a router, or some other suitable network device or network element. In some embodiments, the network nodes 111A, 111B are of a same network node type. For example, in some embodiments, both the network nodes 111A, 111B are border leaf switches. In some embodiments, the network nodes 111A, 111B are of different network node types. For example, in some embodiments, network node 111A is spine switch and network node 111B is a border leaf switch.

Observability framework 109 is communicatively coupled with the network nodes 111A, 111B. The observability framework 109 receives notifications that contain node identities and host names from the network nodes 111A, 111B, and forwards the notifications and/or the information included in the notifications to the policy engine 101.

In some embodiments, policy engine 101 processes a first notification received from a first network node 111A to determine a first status of the first network node 111A. The first notification comprises a first node identifier and a first host name corresponding to the first network node 111A. Policy engine 101 also processes a second notification received from a second network node 111B to determine a second status of the second network node 111B. The second notification comprises a second node identifier and a second host name corresponding to the second network node 111B.

Policy engine 101 then determines whether the first notification and the second notification are defined in the database 103 as being indicative of an alarm state based on the first node identifier, the first host name, the second node identifier, and the second host name. In response to determining the first status and the second status indicate the alarm state, the policy engine 101 causes a workload assigned to a first data center 113 associated with the first network node 111A and the second network node 111B to be reassigned to a second data center 113 different from the first data center 113. For example, if the first status and the second status indicate the alarm state, the workload assigned to data center 113A is reassigned to data center 113B or some other suitable data center 113 that is identifiable based on information included in the database 103.

In some embodiments, policy engine 101 is configured to identify two or more alternative network nodes 111 capable of being used as the first network node 111A or the second network node 111B for facilitating the workload reassigned to the second data center 113 by searching the database 103 for alternative network nodes 111 of a compatible type of network node based on a description of the first network node 111A, the second network node 111B, and the alternative network nodes 111 included in the database 103. Policy engine 101 then causes the workload to be reassigned to the second data center 113 in response to identifying the two or more alternative network nodes 111.

In some embodiments, before causing the workload to be reassigned to the second data center 113 in response to identifying the two or more alternative network nodes 111, policy engine 101 is configured to double check the status of the first network node 111A and the second network node 111B to confirm the alarm state before reassigning the workload. For example, in some embodiments, policy engine 101 (1) processes a third notification received from the first network node 111A to determine a third status of the first network node 111A, (2) processes a fourth notification received from the second network node 111B to determine a fourth status of the second network node 111B, and (3) in response to determining the third status and the fourth status indicate the alarm state, causes the workload to be reassigned to the second data center 113. The first notification, the second notification, the third notification and the fourth notification are, for example, communicated to the policy engine 101 by way of the observability framework 109.

In some embodiments, policy engine 101 is configured to process the third notification and the fourth notification after a preset period of time has elapsed after determining the first status and the second status indicate the alarm state. For example, to avoid prematurely reassigning the workflow, in some embodiments, the policy engine is configured to wait five minutes, or wait for some other suitable period of time, to check to see if the status of one or more of the first network node 111A or the second network node 111B is in the alarm state based on the third notification and the fourth notification before reassigning the workflow to the second data center 113.

In some embodiments, one or more other notifications are received between the first notification and the third notification, for example, and one or more other notifications are received between the second notification and the fourth notification, for example. By delaying processing of the third notification and the fourth notification for the preset period of time, the reassignment of the workload is avoided in a situation in which the determined alarm state is in fact a false alarm or in a situation in which the first network node and/or the second network node self-resolved the failure that resulted in the alarm state within the preset period of time.

In some embodiments, the policy engine 101 causes the network orchestrator 107 to instantiate the workload reassigned to the second data center 113. Policy engine 101 then updates the database 103 to include information indicative of the workload reassigned to the second data center 113 and information indicative of an association between the alternative network nodes 111 and the second data center 113. In some embodiments, to instantiate the workload assigned to the second data center 113, the network orchestrator 107 pushes at least a Day 1 and a Day 2 configuration to the alternative network nodes 111 to facilitate performance of the workload following reassignment to the second data center 113.

In some embodiments, in the case of a communication network failure that occurs when a disaster occurs such as a distributed point-of-presence (Distri Pop) server outage where there is no backup for the centralized unit running on a failed cluster, system 100 makes it possible to automatically heal the communication network. In some embodiments, even when the whole Distri POP fails or a significant portion fails (e.g., several server racks fail), by reassigning centralized unit workloads to different data centers and/or by employing different compatible network nodes. Such automated healing helps to improve communication network dependability and performance while minimizing downtime. Moreover, system 100 makes it possible to efficiently heal a failure indicated by an alarm state by automating the detection of a failure state and the reassignment process which, in turn, makes it possible to manage a communication network with an ever-increasing quantity of network devices, data centers, network nodes, etc., and ever-increasing complexity, while minimizing user oversight.

Figure 2:
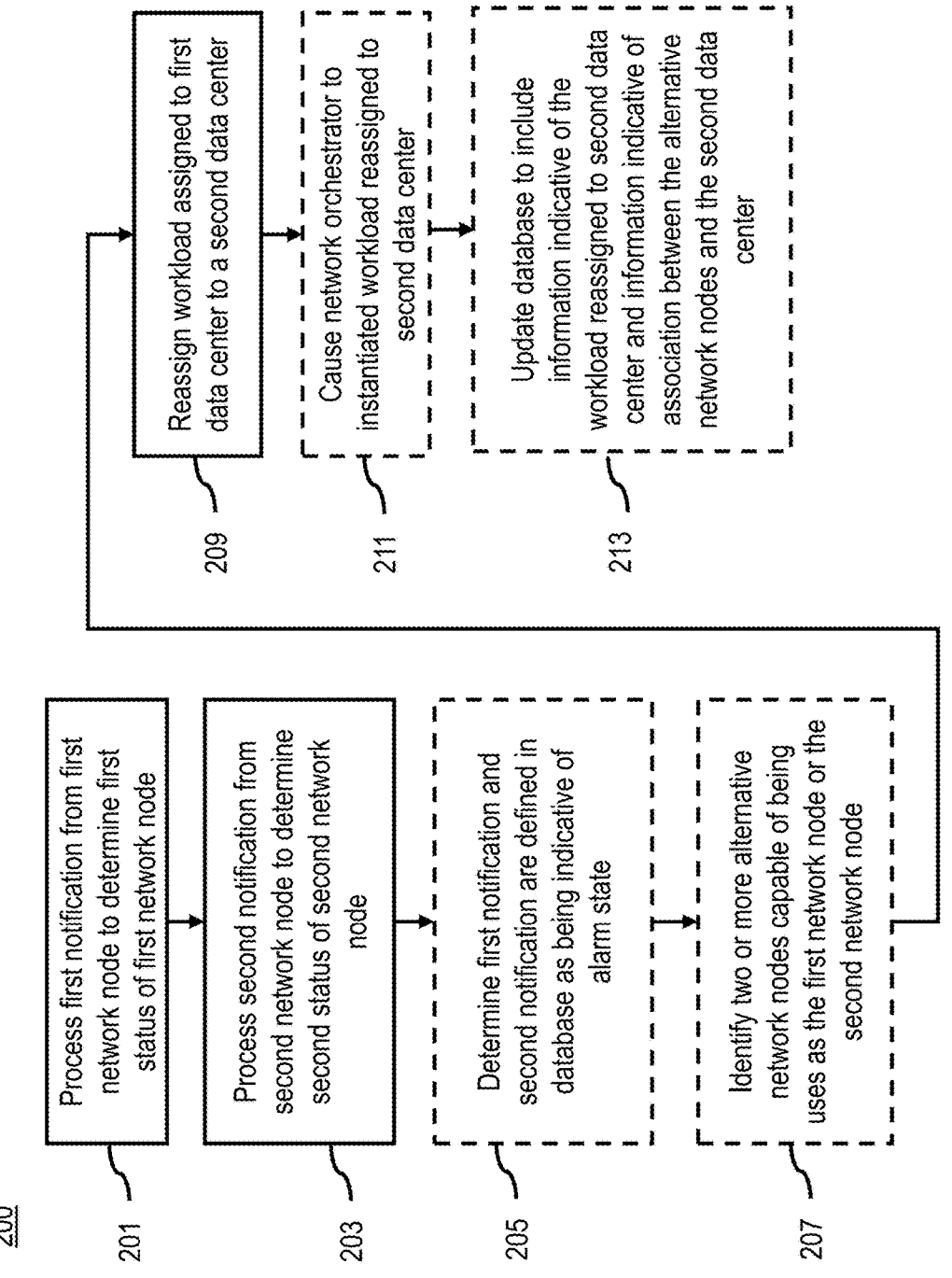
FIG. 2 is a flowchart of a process of detecting a communication network failure and restoring the communication network, in accordance with one or more embodiments.

FIG. 2 is a flowchart of a process 200 of detecting a communication network failure and restoring the communication network, in accordance with one or more embodiments. In some embodiments, policy engine 101 (FIG. 1) performs the process 200.

In step 201, a first notification received from a first network node is processed determine a first status of the first network node. In some embodiments, the first notification comprises a first node identifier and a first host name corresponding to the first network node.

In step 203, a second notification received from a second network node is processed to determine a second status of the second network node. In some embodiments, the second notification comprises a second node identifier and a second host name corresponding to the second network node.

In optional step 205, a determination is made as to whether the first notification and the second notification are defined in a database as being indicative of an alarm state based on the first node identifier, the first host name, the second node identifier, and the second host name.

In optional step 207, two or more alternative network nodes capable of being used as the first network node or the second network node are identified by searching the database for alternative network nodes of a compatible type of network node based on a description of the first network node, the second network node, and the alternative network nodes included in the database.

In step 209, in response to determining the first status and the second status indicate an alarm state, a workload assigned to a first data center associated with the first network node and the second network node is caused to be reassigned to a second data center different from the first data center. In some embodiments, the workload is caused to be reassigned to the second data center in response to identifying the two or more alternative network nodes that capable of being used as the first network node or the second network node for facilitating the workload reassigned to the second data center.

In some embodiments, before causing the workload to be reassigned to the second data center in response to identifying the two or more alternative network nodes, the alarm state is confirmed before reassigning the workload. For example, in some embodiments, a third notification received from the first network node is processed to determine a third status of the first network node, a fourth notification received from the second network node is processed to determine a fourth status of the second network node and, in response to determining the third status and the fourth status indicate the alarm state, the workload is caused to be reassigned to the second data center.

In some embodiments, the third notification and the fourth notification are processed after a preset period of time has elapsed after determining the first status and the second status indicate the alarm state. For example, to avoid prematurely reassigning the workflow, in some embodiments, a preset period of five minutes, or some other suitable period of time, elapses before checking to see if the status of one or more of the first network node or the second network node is in the alarm state based on the third notification and the fourth notification before reassigning the workflow to the second data center. In some embodiments, the third notification and the fourth notification immediately follow a sequence of notifications from the first network node and the second network node received by way of an observability framework. In some embodiments, one or more other notifications are received between the first notification and the third notification, for example, and one or more other notifications are received between the second notification and the fourth notification, for example. By delaying processing of the third notification and the fourth notification for the preset period of time, the reassignment of the workload is avoided in a situation in which the determined alarm state is in fact a false alarm or in a situation in which the first network node and/or the second network node self-resolved the failure that resulted in the alarm state within the preset period of time.

In optional step 211, a network orchestrator is caused to instantiate the workload reassigned to the second data center.

In optional step 213, the database is updated to include information indicative of the workload reassigned to the second data center and information indicative of an association between the alternative network nodes and the second data center. In some embodiments, to instantiate the workload assigned to the second data center, the network orchestrator pushes at least a Day 1 and a Day 2 configuration to the alternative network nodes to facilitate performance of the workload following reassignment to the second data center.

FIGS. 3-10 are data flow diagram of processes 300, 400, 500, 600, 700, 800, 900, 1000 of performing detection of a data center failure and subsequent operations after detecting the failure, in accordance with some embodiments.

The above processes 300, 400, 500, 600, 700, 800, 900, 1000 are executed by a processor such as processor 1103 discussed below with respect to FIG. 11. In some embodiments, some, or all the operations of the process for detecting the data center failure and the subsequent operations are executed in accordance with instructions stored in memory 1105 discussed below with respect to FIG. 11.

The process for detecting data center failure 300 includes operations 351-373. Processes 400, 500, 600, 700, 800, 900, 1000 include operations 451-465, 551-567, 651-679, 751-777, 851-869, 951-955, 1051-1079. The operations discussed are not necessarily performed in the order shown. Operations are capable of being added, replaced, order changed, and/or eliminated as appropriate, in accordance with the spirit and scope of the embodiments. In some embodiments, one or more of the operations of these processes are repeated. In some embodiments, unless specifically stated otherwise, the operations of these processes are performed in order.

(Fault)

Figure 3:
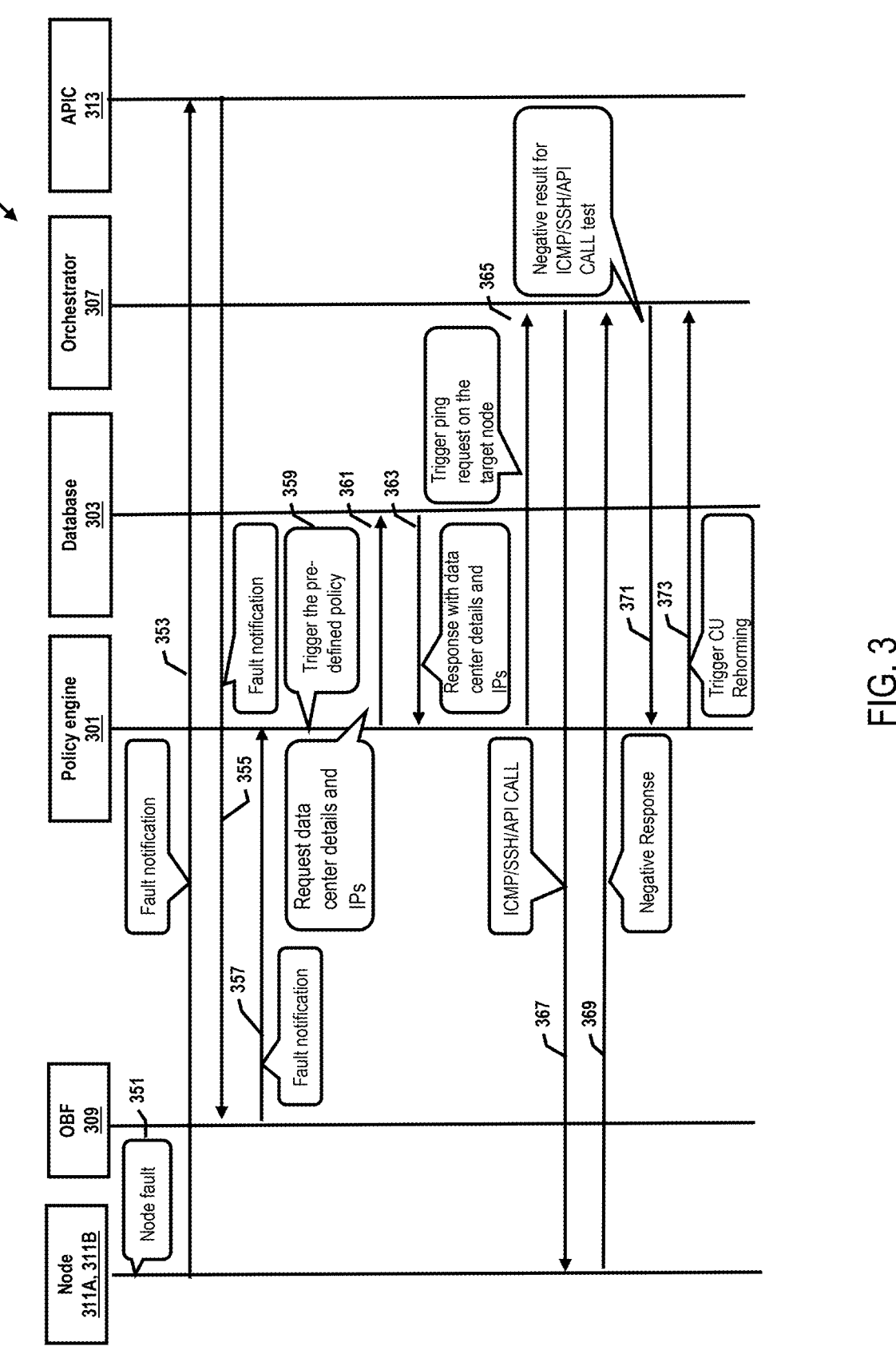
FIG. 3 is a data flow diagram of a process of performing detection of a data center failure, in accordance with one or more embodiments.

FIG. 3 is a data flow diagram of a process 300 of performing detection of a data center failure, in accordance with one or more embodiments.

In operation 351, a fault is detected at nodes 311A and/or 311B. In operation 353, after detecting network node fault, at least one of network nodes 311A, 311B sends a fault notification to an application policy infrastructure controller (APIC) 313. In response to receiving the fault notification, the APIC 313 forwards the fault notification to observability framework (OBF) 309 in operation 355. OBF 309 then forwards the fault notification to policy engine 301 in operation 357. In some embodiments, the fault notification includes a node identifier (for example, "2101, 2102 . . . ") and a host name.

(Fault Correction)

In operation 359, the policy engine 301 determines that the fault notification triggers a pre-defined policy. In operation, 361, the policy engine 301 sends a request to database 303 for data center details and IPs of all or some network nodes identified in the database 303. In operation 363, the database 303 sends a response to the policy engine 301 that includes the data center details and IPs. In some embodiments, the data center details include one or more of an F1C alarm correlation for a distributed unit (DU) or a network configuration protocol session status for the centralized unit (CU).

In operation 365, the policy engine 301 requests a network orchestrator 307 to trigger a ping request on the network node(s) 311A, 311B. In operation 367, the network orchestrator 307 sends an internet control message protocol (ICMP)/secure shell (SSH)/application programming interface (API) call to the network nodes 311A, 311B. In operation 369, a negative response is received by the network orchestrator 307 from the network nodes 311A, 311B. In some embodiments, operation 369 is representative that no response is received by the network orchestrator 307 from the network nodes 311A, 311B. In some embodiments, operations 365-371 are health checks that are repeated two or more times to confirm the negative response and/or the failure to receive a response. In some embodiments, operations 365-371 are repeated five times or some other suitable predefined quantity of times.

In some embodiments, in response to both responses from the network nodes 311A, 311B, or lack thereof, indicating the network nodes are in a failure state, the policy engine triggers a rehoming process to reassign the workload to another data center in operation 373. In some embodiments, the rehoming process involves the network orchestrator 307 determining two or more alternative network nodes that are capable of being used as the network nodes, from the viewpoint of compatibility, capacity, or other suitable factors according to the information available in database 303. The network orchestrator 307 then pushes Day 1 and Day 2 configurations to the alternative network nodes to facilitate performance of the workload, for example.

(Inventory/DNS Cleanup)

Figure 4:
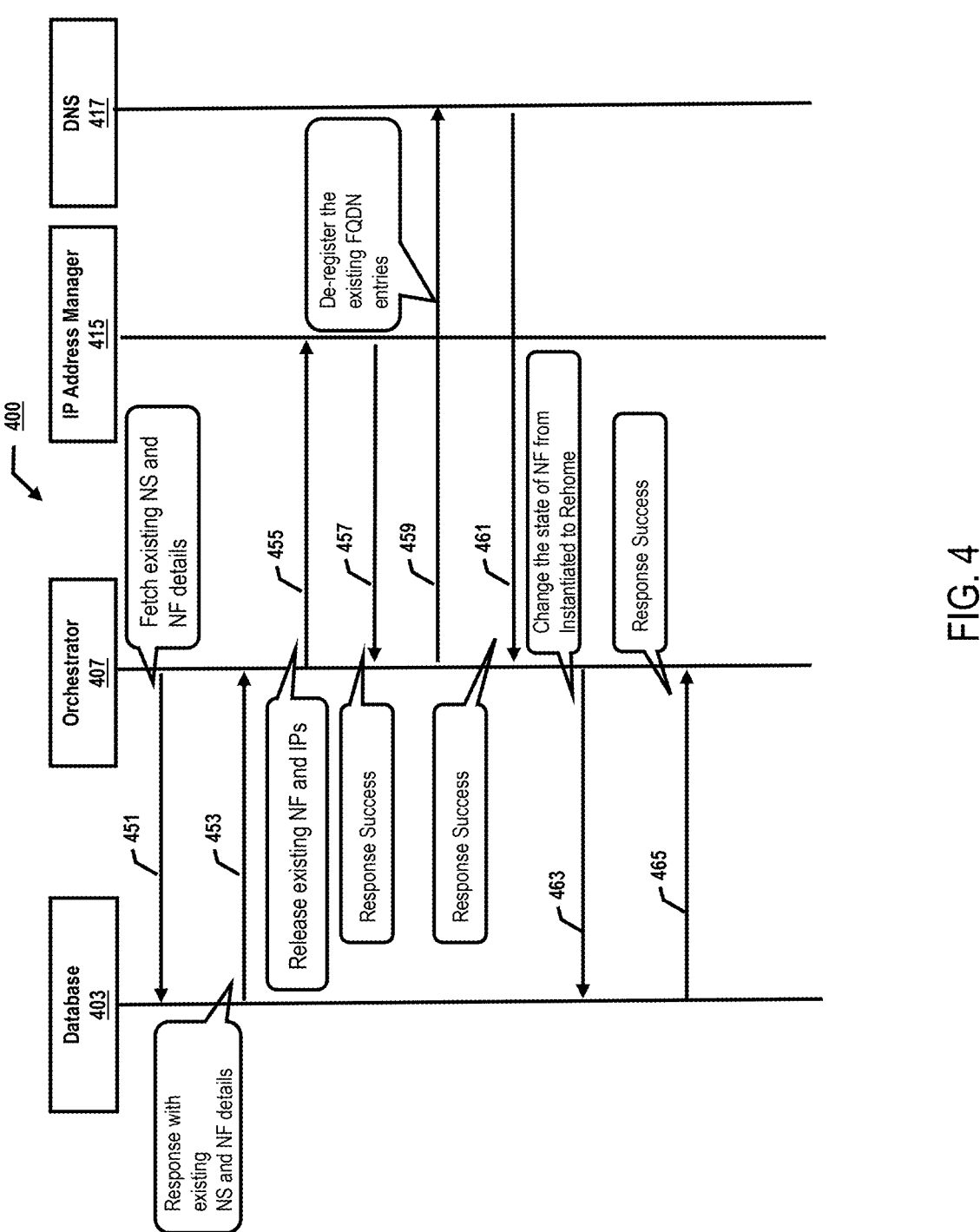
FIG. 4 is a data flow diagram of a subsequent process after detection of the data center failure, in accordance with one or more embodiments.

FIG. 4 is a data flow diagram of a subsequent process 400 after performing detection of the data center failure, in accordance with one or more embodiments.

In operation 451, a network orchestrator 407 fetches existing network service (NS) and network function (NF) details in from a database 403. In operation 453, the database 403 sends a response to the network orchestrator with the details of the existing ND and NF. In operation 455, the network orchestrator 407 instructs an internet protocol (IP) address manager 415 to release the existing NF IPs. Then, in operation 457, the network orchestrator 407 receives a success response from the IP address manager 415. In operation 459, the network orchestrator 407 instructs domain name server (DNS) 417 to de-registers existing fully qualified domain name (FQDN) entries. In operation 461, the DNS 417 sends a response to the network orchestrator 407 indicating the existing FQDN entries were successfully de-registered. In operation 463, the network orchestrator 407 sends an instruction to the database 403 to change the state of the NF from instantiated to rehome. Then, in operation 465, the network orchestrator 407 receives a response success message from the database 403.

(Day 0 Parameter Generation)

Figure 5:
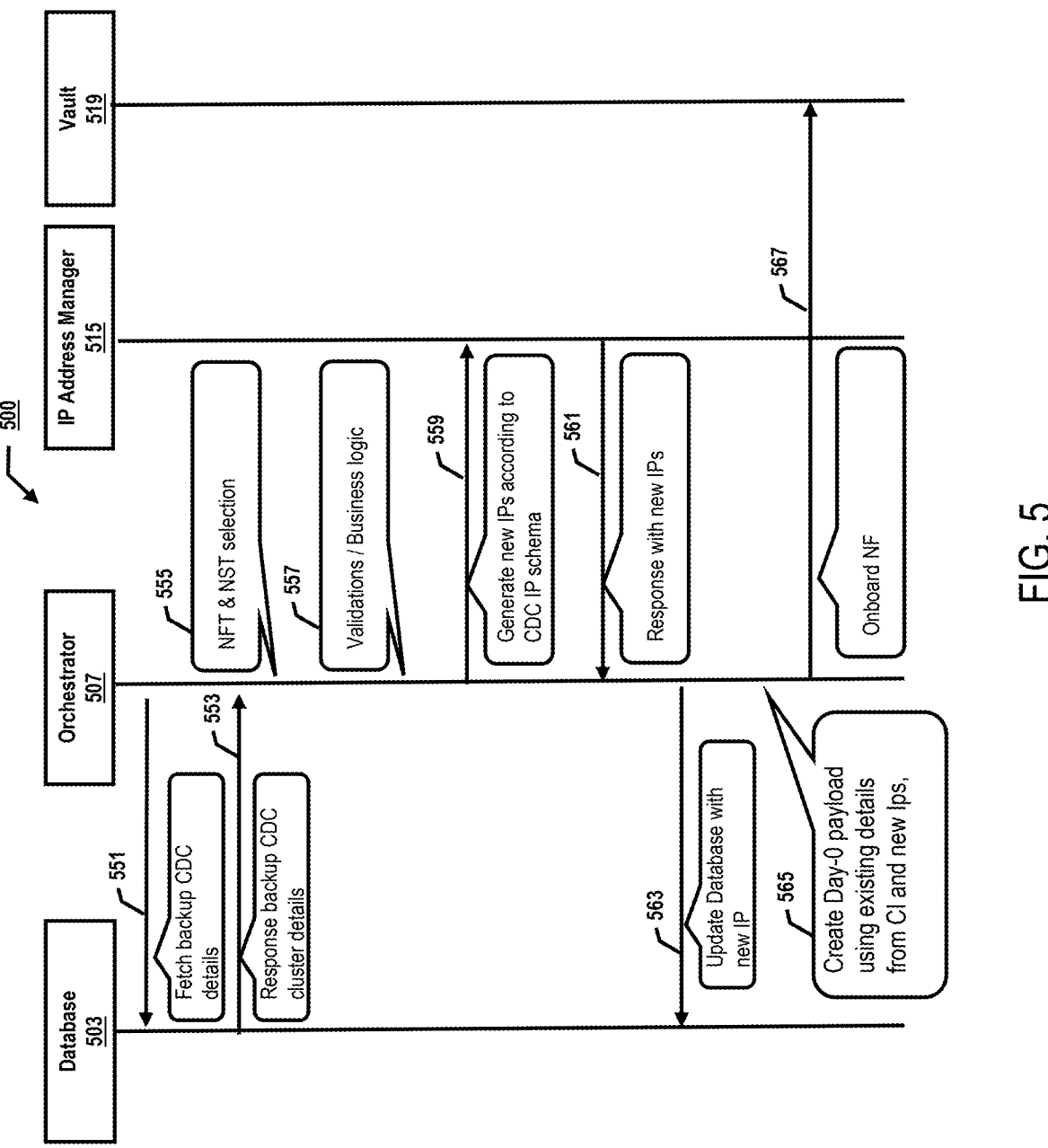
FIG. 5 is a data flow diagram of a subsequent process after detection of the data center failure, in accordance with one or more embodiments.

FIG. 5 is a data flow diagram of a subsequent process 500 after performing detection of the data center failure, in accordance with one or more embodiments.

In operation 551 a network orchestrator 507 fetches backup cluster data center (CDC) details from a database 503. In operation 553, the network orchestrator 507 receives the backup CDC details from the database 503. Then, in operation 555, the network orchestrator 507 checks existing network function topology (NFT) and network service topology (NST) and selects the same NFT/NST for deployment in the CDC. In operation 557, the network orchestrator 507 applies business logic and validates the selected NFT/NST for deployment. In operation 559, the network orchestrator 507 requests an IP address manager 515 to provide new IPs according to the CDC IP schema. In operation 561, the IP address manager 515 generates the new IPs and response to the network orchestrator 507 with the new IPs. In operation 563, the network orchestrator 507 sends the new IP to the database 503 to update the database 503. In operation 565, the network orchestrator 507 applies business logic and validations for NF deployment and parameter generation and generates a Day-0 payload using the detail received from the database 503 and the new IPs. In some embodiments, the same node ID and hostname are used.

In operation 567, the network orchestrator 307 sends the Day-0 payload to a vault 519 to onboard the NF.

(Centralized Unit NF)

Figure 6:
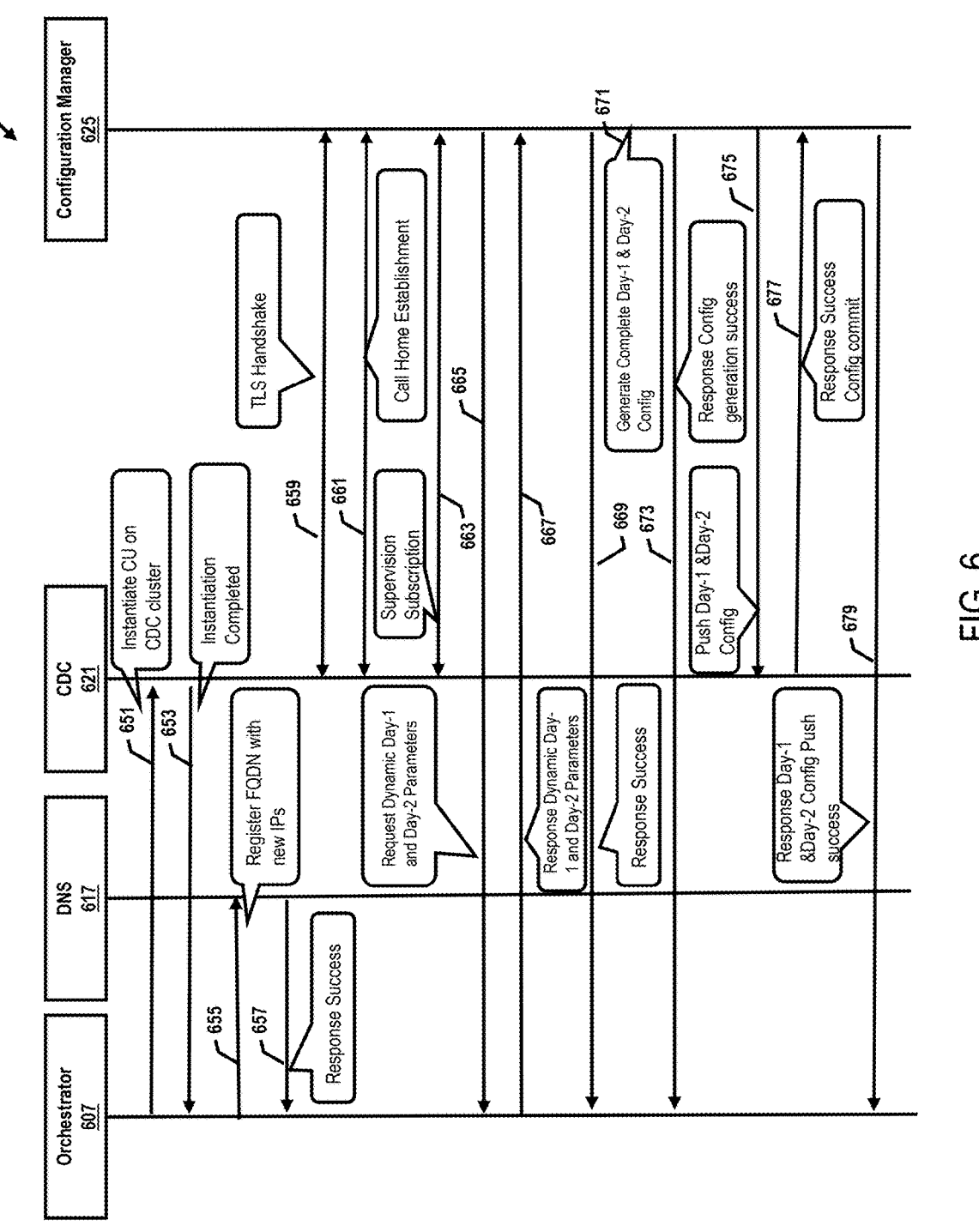
FIG. 6 is a data flow diagram of a subsequent process after detection of the data center failure, in accordance with one or more embodiments.

FIG. 6 is a data flow diagram of subsequent process 600 after performing detection of the data center failure, in accordance with one or more embodiments.

In operation 651, a network orchestrator 607 sends an instruction to instantiate a centralized unit (CU) on a CDC 621. In operation 653, the CDC 621 sends an instantiation completed message to the network orchestrator 607. In operation 655, the network orchestrator 607 registers the FQDN with the new IPs to a domain name system (DNS) 617. In operation 657, the DNS 617 sends a response success message to the network orchestrator 607. In operation 659, the CDC 621 performs a transport layer security (TLS) handshake with a configuration manager 625. In operations 661-663, the CDC 621 and the configuration manager 625 perform call home establishment and supervision subscription processes.

In operation 665, the configuration manager 625 requests Dynamic Day 1 & Day 2 Parameters from the network orchestrator 607. The network orchestrator 607, in response, sends the dynamic Day 1 & Day 2 parameters to the configuration manager 625 in operation 667. In operation 669, the configuration manager 625 sends a success response to the network orchestrator 607.

In operation 671, the configuration manager 625 generates complete Day 1 & Day 2 configurations. In operation 673, the configuration manager 625 sends a configuration generation success message to the network orchestrator 607.

In operation 675, the configuration manager 625 pushes the Day 1 & Day 2 configurations to the CDC 621. In operation 677, the CDC 621 sends a response to the configuration manager 625 indicating the configuration has been successfully implemented/committed. In operation 679, the configuration manager 625 sends a Day 1 & Day 2 configuration push success message to the network orchestrator 607.

(Distributed Unit NF Option 1)

Figure 7:
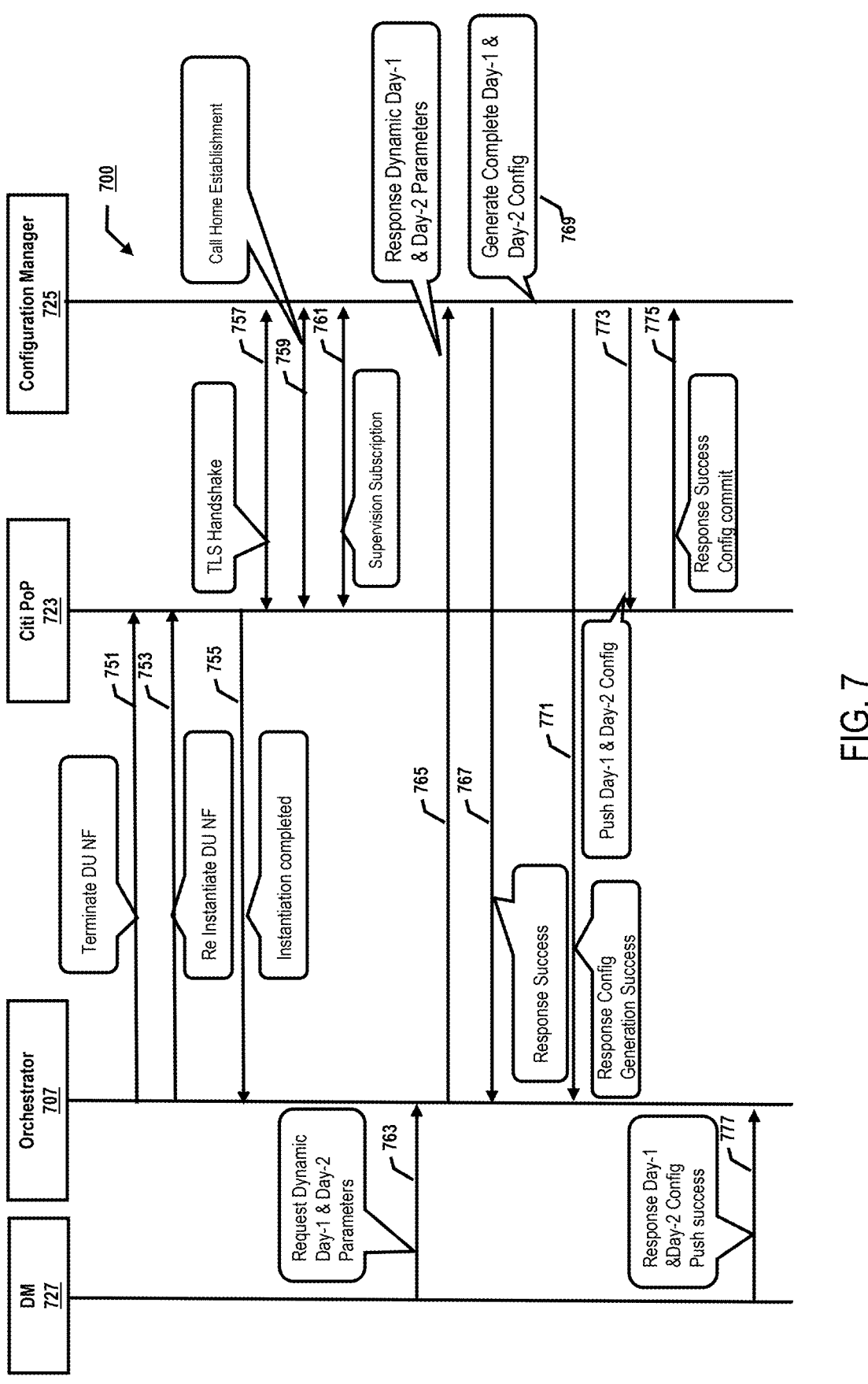
FIG. 7 is a data flow diagram of a subsequent process after detection of the data center failure, in accordance with one or more embodiments.

FIG. 7 is a data flow diagram of subsequent process 700 after performing detection of the centralized unit failure, in accordance with one or more embodiments.

In operation 751, a network orchestrator 707 instructs a Citi PoP 723 to terminate a distributed unit (DU) NF. In operation 753, the network orchestrator 707 instructs the Citi POP to reinstantiate the DU NF. In operation 755, the Citi Pop 723 sends a response message to the network orchestrator 707 indicating that the instantiation is completed. In operation 757, the Citi PoP 723 and a configuration manager 725 perform a TLS handshake. In operations 759-761, the Citi Pop 723 and the configuration manager 725 perform call home establishment and supervision subscription processes.

In operation 763, a deployment manager (DM) 727 requests the network orchestrator 707 to provide dynamic Day 1 & Day 2 parameters to the configuration manager 725. In operations 765, the network orchestrator 707 sends a response with the dynamic Day 1 & Day 2 parameters to the configuration manager 725. In operation 767, the configuration manager 725 sends a success message to the network orchestrator 707.

In operation 769, the configuration manager 725 generates complete Day 1 & Day 2 configurations. In operation 771, the configuration manager 725 sends a configuration generation success message to the network orchestrator 707. In operation 773, the configuration manager 725 pushes the Day 1 & Day 2 configurations to the Citi Pop 723. In operation 775, the Citi Pop 723 returns a response to the configuration manager 725 indicating the configuration has been successfully implemented/committed. In operation 777, the DM 727 sends a Day 1 & Day 2 configuration push success message to the network orchestrator 707.

(Distributed Unit NF Option 2)

Figure 8:
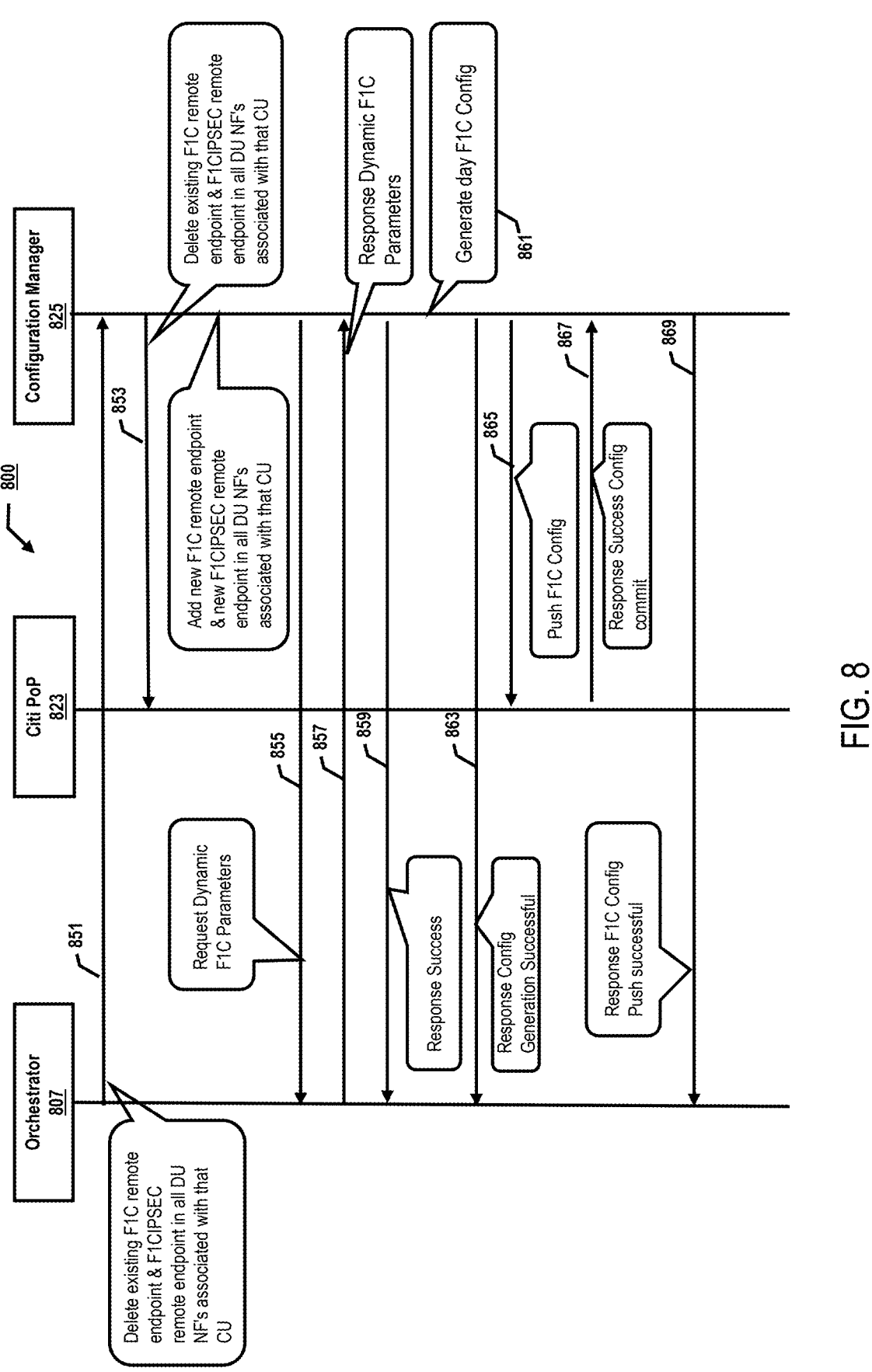
FIG. 8 is a data flow diagram of a subsequent process after detection of the data center failure, in accordance with one or more embodiments.

FIG. 8 is a data flow diagram of subsequent process 800 after performing detection of the data center failure, in accordance with one or more embodiments.

In operation 851, a network orchestrator 807 sends an instruction to a configuration manager 825 to delete an existing F1 control plane (F1C) remote endpoint and a F1C internet protocol security (IPSEC) remote endpoint in all Distributed Unit (DU) NF's associated with a centralized unit (CU).

In operation 853, the configuration manager 825 forwards the instruction to delete existing F1C remote endpoint and F1CIPSEC remote endpoint in all DU NF's associated with the CU is forwarded to a Citi Pop 823.

In some embodiments, new F1C remote endpoints and new F1CIPSEC remote endpoints are added in all DU NF's associated with the CU by the configuration manager 825. In operation 855, the configuration manager 825 sends a message to the network orchestrator 807 requesting dynamic F1C parameters. In operation 857, the network orchestrator 807 sends the dynamic F1C parameters to the configuration manager 825. In operation 859, the configuration manager 825 sends a response success message to the network orchestrator 807.

In operation 861, the configuration manager 825 generates the F1C configuration. In operation 863, the configuration manager 825 sends a configuration generation success message to the network orchestrator 807.

In operation 865, the configuration manager pushes the F1C config to the Citi Pop 823. In step 867, the Citi Pop 823 returns a response to the configuration manager 825 indicating the configuration has been successfully implemented/committed. In operation 869, the configuration manager 825 sends an F1C configuration push success message to the network orchestrator 807.

(Distributed Unit NF Option 3)

Figure 9:
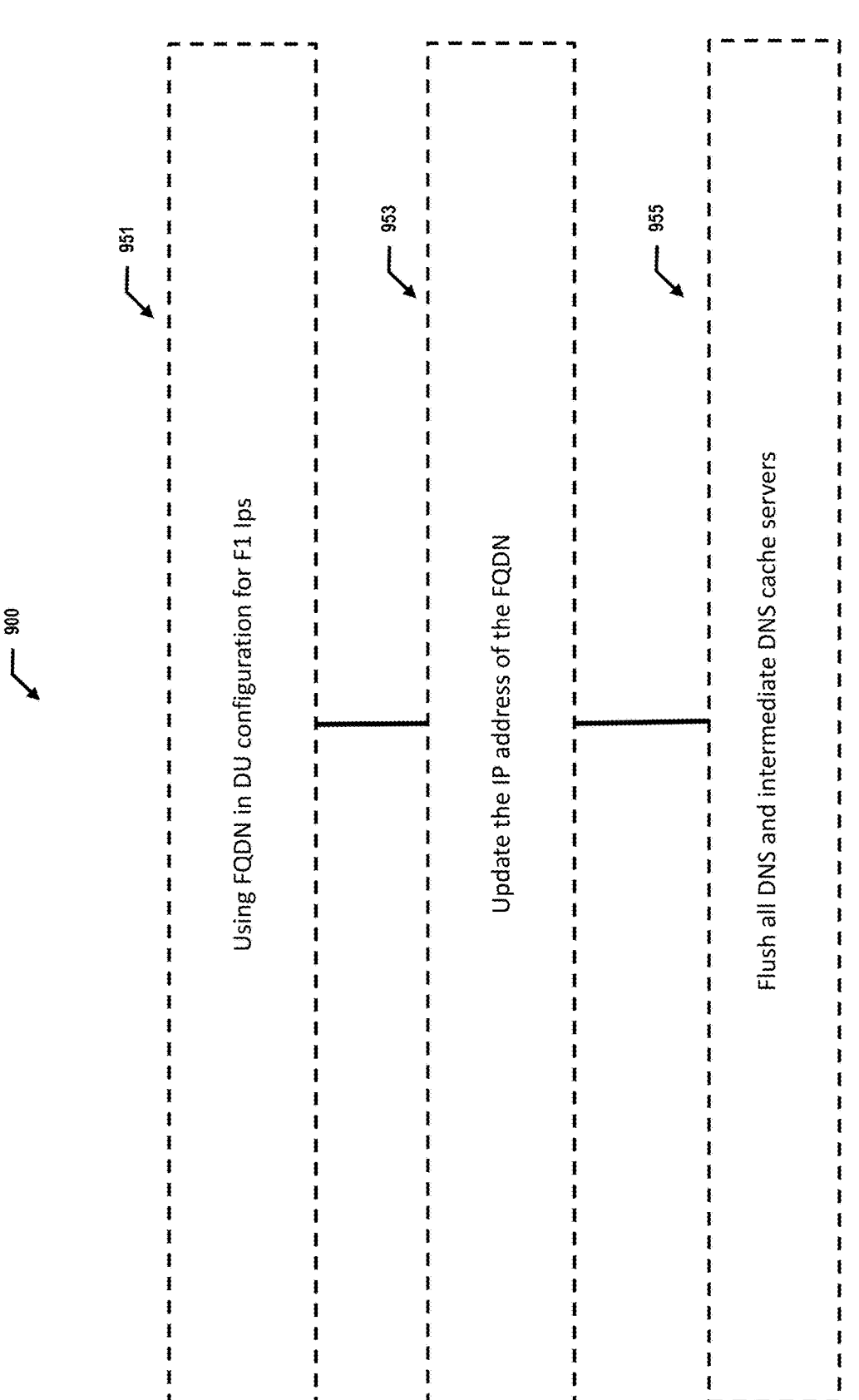
FIG. 9 is a data flow diagram of a subsequent process after detection of the data center failure, in accordance with one or more embodiments.

FIG. 9 is a data flow diagram of a subsequent process 900 after performing detection of the centralized unit failure, in accordance with one or more embodiments.

In operation 951, FQDN in DU configuration for F1 IPs is used.

In operation 953, an IP address of the FQDN is updated. In some embodiments, operation 953 is an update (patch) API operation.

In operation 955, all DNS and intermediate DNS cache servers etc., are flushed. In some embodiments, the flushing of the DNS and intermediate DNS cache servers is performed with some delay depending whether some negative cache exists which is negligible in the DNS setup.

(Power on Notification in Case Distributed Unit NF Option 1)

Figure 10:
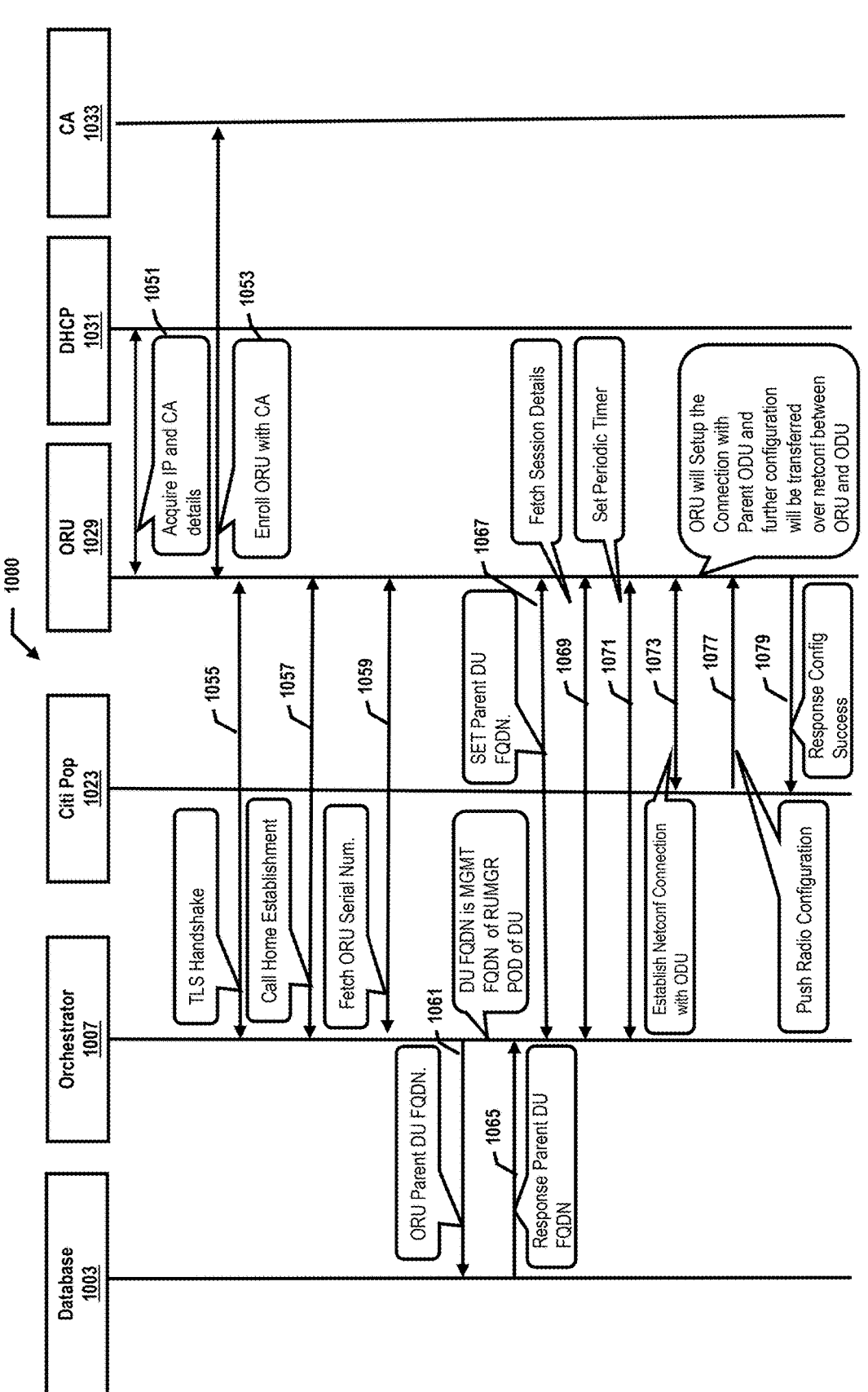
FIG. 10 is a data flow diagram of a subsequent process after detection of the data center failure, in accordance with one or more embodiments.

FIG. 10 is a data flow diagram of a subsequent process 1000 after performing detection of the centralized unit failure, in accordance with one or more embodiments.

In operation 1051, an open radio access network (O-RAN) radio unit (ORU) 1029 acquires IP and certification authority (CA) details from a dynamic host configuration protocol (DHCP) server 1031. In operation 1053, the ORU 1029 is enrolls with a CA 1033. In some embodiments, the CA 1033 is the Enterprise JavaBeans Certificate Authority (EJBCA) or some other suitable certificate authority. In operation 1055, a network orchestrator 1007 and the ORU 1029 perform a TLS Handshake. In operations 1057-1059, the network orchestrator 1007 and the ORU 1029 perform call home establishment, and fetch ORU serial number processes.

In operation 1061, the network orchestrator 1007 sends an ORU parent DU FQDN request to a database 1003. In operation 1065, the database 1003 sends the requested parent DU FQDN to the network orchestrator 1007. In some embodiments, the DU FQDN is a management (MGMT) FQDN of a Rumantsch Grischun (RUMGR)_plain old data (PoD) structure of the DU.

In operation 1067, the network orchestrator 1007 and the ORU 1029 set the parent DU FQDN. In operation 1069, the network orchestrator 1007 and the ORU 1029 fetch session details. In operation 1071, the network orchestrator 1007 and the ORU 1029 set a periodic timer. In operation 1073, a network configuration protocol (Netconf) connection is established between a Citi Pop 1023 and the ORU 1029. In some embodiments, the Citi PoP 1023 is an O-RAN distributed unit (ODU).

In some embodiments, the ORU 1029 sets up the netconf connection with the Citi PoP 1023 to facilitate transferring a radio configuration over the Netconf connection between the ORU 1029 and the Citi PoP 1023. In some embodiments, Citi PoP 1023 is a parent ODU.

In operation 1077, Citi Pop 1023 pushes a radio configuration to the ORU 1029. In operation 1079, the ORU 1029 sends a configuration push success message of to the Citi Pop 1023. After the configuration push, the DU will be operational.

Figure 11:
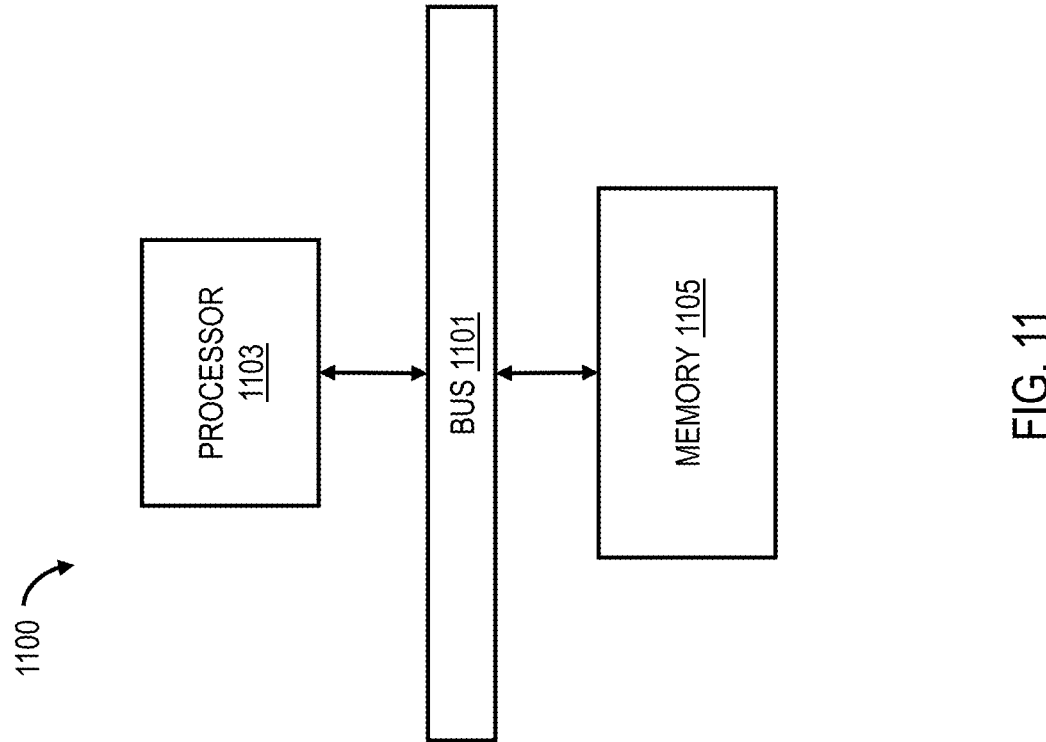
FIG. 11 is a functional block diagram of a computer or processor-based system upon which or by which an embodiment is implemented.

FIG. 11 is a functional block diagram of a computer or processor-based system 1100 upon which or by which an embodiment is implemented.

Processor-based system 1100 is programmed to facilitate detecting a communication network failure and restoring the communication network, as described herein, and includes, for example, bus 1101, processor 1103, and memory 1105 components.

In some embodiments, the processor-based system is implemented as a single "system on a chip." Processor-based system 1100, or a portion thereof, constitutes a mechanism for performing one or more steps of detecting a communication network failure and restoring the communication network.

In some embodiments, the processor-based system 1100 includes a communication mechanism such as bus 1101 for transferring and/or receiving information and/or instructions among the components of the processor-based system 1100. Processor 1103 is connected to the bus 1101 to obtain instructions for execution and process information stored in, for example, the memory 1105. In some embodiments, the processor 1103 is also accompanied with one or more specialized components to perform certain processing functions and tasks such as one or more digital signal processors (DSP), or one or more application-specific integrated circuits (ASIC). A DSP typically is configured to process real-world signals (e.g., sound) in real time independently of the processor 1103. Similarly, an ASIC is configurable to perform specialized functions not easily performed by a more general-purpose processor. Other specialized components to aid in performing the functions described herein optionally include one or more field programmable gate arrays (FPGA), one or more controllers, or one or more other special-purpose computer chips.

In one or more embodiments, the processor (or multiple processors) 1103 performs a set of operations on information as specified by a set of instructions stored in memory 1105 related to detecting a communication network failure and restoring the communication network. The execution of the instructions causes the processor to perform specified functions.

The processor 1103 and accompanying components are connected to the memory 1105 via the bus 1101. The memory 1105 includes one or more of dynamic memory (e.g., RAM, magnetic disk, writable optical disk, etc.) and static memory (e.g., ROM, CD-ROM, etc.) for storing executable instructions that when executed perform the steps described herein to facilitate detecting a communication network failure and restoring the communication network. The memory 1105 also stores the data associated with or generated by the execution of the steps.

In one or more embodiments, the memory 1105, such as a random-access memory (RAM) or any other dynamic storage device, stores information including processor instructions for detecting a communication network failure and restoring the communication network. Dynamic memory allows information stored therein to be changed. RAM allows a unit of information stored at a location called a memory address to be stored and retrieved independently of information at neighboring addresses. The memory 1105 is also used by the processor 1103 to store temporary values during execution of processor instructions. In various embodiments, the memory 1105 is a read only memory (ROM) or any other static storage device coupled to the bus 1101 for storing static information, including instructions, that is not capable of being changed by processor 1103. Some memory is composed of volatile storage that loses the information stored thereon when power is lost. In some embodiments, the memory 1105 is a non-volatile (persistent) storage device, such as a magnetic disk, optical disk, or flash card, for storing information, including instructions, that persists even when the system 1100 is turned off or otherwise loses power.

The term "computer-readable medium" as used herein refers to any medium that participates in providing information to processor 1103, including instructions for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer can read. The term computer-readable storage medium is used herein to refer to a computer-readable medium.

Various embodiments of this description include the following examples.

Example [1] is an apparatus, comprising a processor and a memory having instructions stored thereon that, when executed by the processor, cause the apparatus to process a first notification received from a first network node to determine a first status of the first network node. The apparatus is also caused to process a second notification received from a second network node to determine a second status of the second network node. The apparatus is further caused to, in response to determining the first status and the second status indicate an alarm state, cause a workload assigned to a first data center associated with the first network node and the second network node to be reassigned to a second data center different from the first data center.

Example [2] is an apparatus according to Example [1], wherein the first notification comprises a first node identifier and a first host name corresponding to the first network node, the second notification comprises a second node identifier and a second host name corresponding to the second network node, and the apparatus is further caused to determine whether the first notification and the second notification are defined in a database as being indicative of the alarm state based on the first node identifier, the first host name, the second node identifier, and the second host name. The apparatus is additionally caused to identify two or more alternative network nodes capable of being used as the first network node or the second network node for facilitating the workload reassigned to the second data center by searching the database for alternative network nodes of a compatible type of network node based on a description of the first network node, the second network node, and the alternative network nodes included in the database. The apparatus is also caused to cause the workload to be reassigned to the second data center in response to identifying the two or more alternative network nodes.

Example [3] is an apparatus according to in any one of Examples [1] to [2], wherein, before causing the workload to be reassigned to the second data center in response to identifying the two or more alternative network nodes, the apparatus is further caused to process a third notification received from the first network node to determine a third status of the first network node. The apparatus is also caused to process a fourth notification received from the second network node to determine a fourth status of the second network node. The apparatus is additionally caused to, in response to determining the third status and the fourth status indicate the alarm state, cause the workload to be reassigned to the second data center.

Example [4] is an apparatus according to any one of Examples [1] to [3], wherein the third notification and the fourth notification are processed after a preset period of time has elapsed after determining the first status and the second status indicate the alarm state.

Example [5] is an apparatus according to any one of Examples [1] to [4], wherein the first notification, the second notification, the third notification and the fourth notification are received by way of an observability framework communicatively coupled with the first network node and the second network node.

Example [6] is an apparatus according to any one of Examples [1] to [5], wherein the apparatus is further caused to cause a network orchestrator to instantiate the workload reassigned to the second data center. The apparatus is also caused to update the database to include information indicative of the workload reassigned to the second data center and information indicative of an association between the alternative network nodes and the second data center.

Example [7] is an apparatus according to any one of Examples [1] to [6], wherein to instantiate the workload assigned to the second data center, the network orchestrator pushes at least a Day 1 and a Day 2 configuration to the alternative network nodes to facilitate performance of the workload following reassignment to the second data center.

Example [8] is an apparatus according to any one of Examples [1] to [7], wherein the first network node and the second network node are switches.

Example [9] is an apparatus according to any one of Examples [1] to [8], wherein the first network node and the second network node are border leaf switches.

Example [10] is an apparatus according to any one of Examples [1] to [9], wherein the first network node and the second network node are of a same network node type, and the network node type is a switch, a spine switch, an access gateway switch, a computer, or a router.

Example [11] is an apparatus according to any one of Examples [1] to [10], wherein the first network node is a first network node type, the second network node is a second network node type different from the first network node type, and the first network node type and the second network node type comprise one or more of a switch, a border leaf switch, a spine switch, an access gateway switch, a computer, or a router.

Example [12] is a method, comprising processing, by a processor, a first notification received from a first network node to determine a first status of the first network node. The method also comprises processing a second notification received from a second network node to determine a second status of the second network node. In response to determining the first status and the second status indicate an alarm state, the method further comprises causing a workload assigned to a first data center associated with the first network node and the second network node to be reassigned to a second data center different from the first data center.

Example 13 is a method according to Example [12], wherein the first notification comprises a first node identifier and a first host name corresponding to the first network node, the second notification comprises a second node identifier and a second host name corresponding to the second network node. The method further comprises determining whether the first notification and the second notification are defined in a database as being indicative of the alarm state based on the first node identifier, the first host name, the second node identifier, and the second host name. The method also comprises identifying two or more alternative network nodes capable of being used as the first network node or the second network node for facilitating the workload reassigned to the second data center by searching the database for alternative network nodes of a compatible type of network node based on a description of the first network node, the second network node, and the alternative network nodes included in the database. The method additionally comprises causing the workload to be reassigned to the second data center in response to identifying the two or more alternative network nodes.

Example [14] is method according to any one of Examples [12] to [13], wherein, before causing the workload to be reassigned to the second data center in response to identifying the two or more alternative network nodes, the method further comprises processing a third notification received from the first network node to determine a third status of the first network node. The method also comprises processing a fourth notification received from the second network node to determine a fourth status of the second network node. The method further comprises, in response to determining the third status and the fourth status indicate the alarm state, causing the cause the workload to be reassigned to the second data center.

Example [15] is method according to any one of Examples [12] to [14], wherein the third notification and the fourth notification are processed after a preset period of time has elapsed after determining the first status and the second status indicate the alarm state.

Example [16] is method according to any one of Examples [12] to [15], further comprising causing a network orchestrator to instantiate the workload reassigned to the second data center. The method additionally comprises updating the database to include information indicative of the workload reassigned to the second data center and information indicative of an association between the alternative network nodes and the second data center.

Example [17] is method according to any one of Examples [12] to [16], wherein the first network node and the second network node are border leaf switches.

Example [18] is method according to any one of Examples [12] to [17], wherein the first network node and the second network node are of a same network node type, and the network node type is a switch, a spine switch, an access gateway switch, a computer, or a router.

Example [19] is method according to any one of Examples [12] to [18], wherein the first network node is a first network node type, the second network node is a second network node type different from the first network node type, and the first network node type and the second network node type comprise one or more of a switch, a border leaf switch, a spine switch, an access gateway switch, a computer, or a router.

Example [20] is a non-transitory computer readable medium having instructions stored thereon that, when executed by a processor, cause an apparatus to process a first notification received from a first network node to determine a first status of the first network node. The apparatus is also caused to process a second notification received from a second network node to determine a second status of the second network node. The apparatus is further caused to, in response to determining the first status and the second status indicate an alarm state, cause a workload assigned to a first data center associated with the first network node and the second network node to be reassigned to a second data center different from the first data center.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure. Although features of the present disclosure are expressed in certain combinations, it is contemplated that these features can be arranged in any combination and order without departing from the spirit and scope of the present disclosure.

What is claimed is:

1. A method, comprising:
processing, by a processor, a first notification received from a first network node to determine a first status of the first network node, wherein the first notification comprises a first node identifier and a first host name corresponding to the first network node;

processing a second notification received from a second network node to determine a second status of the second network node, wherein the second notification comprises a second node identifier and a second host name corresponding to the second network node;

determining whether the first notification and the second notification are defined in a database as being indicative of an alarm state based on the first node identifier, the first host name, the second node identifier, and the second host name;

identifying two or more alternative network nodes capable of being used as the first network node or the second network node for facilitating a workload reassigned to a second data center by searching the database for alternative network nodes of a compatible type of network node based on a description of the first network node, the second network node, and the alternative network nodes included in the database; and in response to identifying the two or more alternative network nodes, causing the workload assigned to a first data center associated with the first network node and the second network node to be reassigned to the second data center different from the first data center.

2. The method of claim 1, wherein, before causing the workload to be reassigned to the second data center in response to identifying the two or more alternative network nodes, the method further comprises:

processing a third notification received from the first network node to determine a third status of the first network node;

processing a fourth notification received from the second network node to determine a fourth status of the second network node; and in response to determining the third status and the fourth status indicate the alarm state, causing the workload to be reassigned to the second data center.

3. The method of claim 2, wherein the third notification and the fourth notification are processed after a preset period of time has elapsed after determining the first status and the second status indicate the alarm state.

4. The method of claim 1, further comprising:

causing a network orchestrator to instantiate the workload reassigned to the second data center; and updating the database to include information indicative of the workload reassigned to the second data center and information indicative of an association between the alternative network nodes and the second data center.

5. The method of claim 1, wherein the first network node and the second network node are border leaf switches.

6. The method of claim 1, wherein the first network node and the second network node are of a same network node type, and the network node type is a switch, a spine switch, an access gateway switch, a computer, or a router.

7. The method of claim 1, wherein the first network node is a first network node type, the second network node is a second network node type different from the first network node type, and the first network node type and the second network node type comprise one or more of a switch, a border leaf switch, a spine switch, an access gateway switch, a computer, or a router.

8. An apparatus, comprising:

a processor; and a memory having instructions stored thereon that, when executed by the processor, cause the apparatus to:

process a first notification received from a first network node to determine a first status of the first network node, wherein the first notification comprises a first node identifier and a first host name corresponding to the first network node;

process a second notification received from a second network node to determine a second status of the second network node, wherein the second notification comprises a second node identifier and a second host name corresponding to the second network node;

determine whether the first notification and the second notification are defined in a database as being indicative of an alarm state based on the first node identifier, the first host name, the second node identifier, and the second host name;

identify two or more alternative network nodes capable of being used as the first network node or the second network node for facilitating a workload reassigned to a second data center by searching the database for alternative network nodes of a compatible type of network node based on a description of the first network node, the second network node, and the alternative network nodes included in the database; and in response to identifying the two or more alternative network nodes, cause the workload assigned to a first data center associated with the first network node and the second network node to be reassigned to the second data center different from the first data center.

9. The apparatus of claim 8, wherein, before causing the workload to be reassigned to the second data center in response to identifying the two or more alternative network nodes, the apparatus is further caused to:

process a third notification received from the first network node to determine a third status of the first network node;

process a fourth notification received from the second network node to determine a fourth status of the second network node; and in response to determining the third status and the fourth status indicate the alarm state, cause the workload to be reassigned to the second data center.

10. The apparatus of claim 9, wherein the third notification and the fourth notification are processed after a preset period of time has elapsed after determining the first status and the second status indicate the alarm state.

11. The apparatus of claim 9, wherein the first notification, the second notification, the third notification and the fourth notification are received by way of an observability framework communicatively coupled with the first network node and the second network node.

12. The apparatus of claim 8, wherein the apparatus is further caused to:

cause a network orchestrator to instantiate the workload reassigned to the second data center; and update the database to include information indicative of the workload reassigned to the second data center and information indicative of an association between the alternative network nodes and the second data center.

13. The apparatus of claim 12, wherein to instantiate the workload assigned to the second data center, the network orchestrator pushes at least a Day 1 and a Day 2 configuration to the alternative network nodes to facilitate performance of the workload following reassignment to the second data center.

14. The apparatus of claim 8, wherein the first network node and the second network node are switches.

15. The apparatus of claim 14, wherein the first network node and the second network node are border leaf switches.

16. The apparatus of claim 8, wherein the first network node and the second network node are of a same network node type, and the network node type is a switch, a spine switch, an access gateway switch, a computer, or a router.

17. The apparatus of claim 8, wherein the first network node is a first network node type, the second network node is a second network node type different from the first network node type, and the first network node type and the second network node type comprise one or more of a switch, a border leaf switch, a spine switch, an access gateway switch, a computer, or a router.

18. A non-transitory computer readable medium having instructions stored thereon that, when executed by a processor, cause an apparatus to:

process a first notification received from a first network node to determine a first status of the first network node, wherein the first notification comprises a first node identifier and a first host name corresponding to the first network node;

process a second notification received from a second network node to determine a second status of the second network node, wherein the second notification comprises a second node identifier and a second host name corresponding to the second network node;

determine whether the first notification and the second notification are defined in a database as being indicative of an alarm state based on the first node identifier, the first host name, the second node identifier, and the second host name;

identify two or more alternative network nodes capable of being used as the first network node or the second network node for facilitating a workload reassigned to a second data center by searching the database for alternative network nodes of a compatible type of network node based on a description of the first network node, the second network node, and the alternative network nodes included in the database; and in response to identifying the two or more alternative network nodes, cause the workload assigned to a first data center associated with the first network node and the second network node to be reassigned to the second data center different from the first data center.

19. The non-transitory computer readable medium of claim 18, wherein, before causing the workload to be reassigned to the second data center in response to identifying the two or more alternative network nodes, the apparatus is further caused to:

process a third notification received from the first network node to determine a third status of the first network node;

process a fourth notification received from the second network node to determine a fourth status of the second network node; and in response to determining the third status and the fourth status indicate the alarm state, cause the workload to be reassigned to the second data center.

20. The non-transitory computer readable medium of claim 19, wherein the third notification and the fourth notification are processed after a preset period of time has elapsed after determining the first status and the second status indicate the alarm state.

* * * * *